United States Patent [19]

Knize et al.

[11] Patent Number: 4,476,100
[45] Date of Patent: Oct. 9, 1984

[54] METHOD OF ENHANCING SELECTIVE ISOTOPE DESORPTION FROM METALS

[75] Inventors: Randall J. Knize, Plainsboro; Joseph L. Cecchi, Lawrenceville, both of N.J.

[73] Assignee: The United States of America as represented by the Unites States Department of Energy, Washington, D.C.

[21] Appl. No.: 517,477

[22] Filed: Jul. 26, 1983

[51] Int. Cl.³ .............................................. B01D 59/00
[52] U.S. Cl. ...................................... 423/249; 55/68; 75/84; 423/248
[58] Field of Search ................ 55/68; 75/84; 252/630; 423/248, 249

[56] References Cited

U.S. PATENT DOCUMENTS

| | | | |
|---|---|---|---|
| 4,276,060 | 6/1981 | Aldridge | 55/68 X |
| 4,328,079 | 5/1982 | Hemmerich | 252/630 X |
| 4,372,928 | 2/1983 | Chatelet et al. | 423/249 |
| 4,425,318 | 1/1984 | Maeland et al. | 423/248 X |
| 4,444,727 | 4/1984 | Yanagihara et al. | 423/248 X |

OTHER PUBLICATIONS

Knize et al., "Enhanced Selective Hydrogen Desorption from Metals" presented at 29th National Symposium, AVS, Baltimore, Md., Nov. 16–19, 1982, 7 pages.
Shivell, "Method of Plasma Impurity Control Without Magnetic Divertor" PPPL-1342, Jun. 1977, 15 pages.
Knize et al., "Measurement of $H_2$, $D_2$ Solubilities in Zr-Al" J. Vac. Sci. Tech., 20(4), Apr. 1, 1982, pp. 1135 to 1137.
Cecchi et al., "Transient Getter Scheme for the Tokamak Fusion Test Reactor," J. Vac. Sci. Tech., 17(1), Jan./Feb., 1980, pp. 294 to 297.
Knize et al., "Compatibility of the Zr-Al Alloy with a Tokamak Plasma Environment," J. Nucl. Mat., 103 & 104, 1981, pp. 539 to 543.

Primary Examiner—Leland A. Sebastian
Attorney, Agent, or Firm—Jeannette M. Walder; Walter L. Rees; Michael F. Esposito

[57] ABSTRACT

A method of enhancing the thermal desorption of a first isotope of a diatomic gas from a metal comprises the steps of (a) establishing a partial pressure of a second isotope of the diatomic gas in vicinity of the metal; heating the metal to a temperature such that the first isotope is desorbed from the metal; and reducing the partial pressure of the desorbed first isotope while maintaining the partial pressure of the second isotope substantially constant. The method is especially useful for enhancing the desorption of tritium from the Zr-Al getter in a plasma confinement device.

10 Claims, 2 Drawing Figures

METHOD OF ENHANCING SELECTIVE ISOTOPE DESORPTION FROM METALS

CONTRACTUAL ORIGIN OF THE INVENTION

The U.S. Government has rights in this invention pursuant to Contract No. DE-AC02-76-CH03073 between the U.S. Department of Energy and Princeton University.

BACKGROUND OF THE INVENTION

This invention relates generally to the field of gas desorption from metals; and, more particularly, to a method of enhancing the selective desorption of a particular isotope of a gas from metals. Enhanced selective desorption is especially useful in the operation of fusion devices.

A crucial element in realizing the high temperatures and fuel densities required for a successful fusion device is the control of plasma impurities. Also, to maximize fusion power output, fuel density must be optimized by controlling fuel recycling in conjunction with selective gas or pellet injection. A number of tokamak experiments have used Ti sublimated on the plasma confinement vessel walls to effect control of both hydrogen recycling (the hydrogen isotopes are the most promising fusion fuel) and impurities. A more promising alternative for hydrogen recycling and impurity removal is the Zr-Al non-evaporable bulk getter (manufactured by S.A.E.S. Getters, S.p.A.), which pumps hydrogen isotopes reversibly. This getter uses the alloy ST101 (R) (a mixture of $Zr_5Al_3$ and $Zr_3Al_2$) in the form of a powder press-bonded to a constantan heating substrate.

During normal operation, the getter pumps impurities irreversibly (sorbs only) and hydrogen isotopes reversibly (sorbs and desorbs). Impurities react chemically with the getter material forming stable products; whereas the hydrogen isotopes form a solution with the alloy. During sorption of gases, the surface of the getter material becomes saturated. Hence regeneration of the hydrogen isotopes from the getter material permits more impurities to be sorbed in subsequent operation. Regeneration of the hydrogen isotopes from the getter is accomplished by thermal desorption: the getter is heated to a high enough temperature to cause desorption, and the desorbed gas is pumped from the vessel. Since the hydrogen isotopes are diatomic molecules, thermal desorption is a second order kinetic process, which means that the desorption rate becomes asymptotically slow. Consequently, desorption involves considerable down-time and is often incomplete. This incomplete desorption can compromise reactor safety when tritium is one of the fuels. In addition, there are other circumstances, such as the need to perform helium leak detection following deuterium plasma operation, for which the incomplete desorption has deleterious consequences as well.

Therefore, it is an object of the present invention to enhance the desorption of a selected isotope from metals.

It is also an object of the present invention to increase the amount of the selected isotope desorbed from a metal, while decreasing the desorption time.

It is yet another object of the present invention to enhance the selective desorption of the hydrogen isotopes from metals.

Additional objects, advantages, and novel features of the invention will be set forth in part in the description which follows, and in part will become apparent to those skilled in the art upon examination of the following or may be learned by practice of the invention.

SUMMARY OF THE INVENTION

The thermal desorption of an isotope of a diatomic gas from a metal, where $q_1(t)$ is the concentration of the isotope in the metal at time t is described by the equation:

$$\frac{dq_1(t)}{dt} = -\alpha q_1(t)^2. \tag{1}$$

where $\alpha$ depends on the metal temperature. The solution to equation (1) is $$(2) \quad q_1(t) = (\alpha t + q_1(o)^{-1})^{-1}$$

If the desorption of the isotope is carried out at a constant pressure of a second isotope of the diatomic gas, where $q_2$, the concentration of the second isotope, is constant, then $$(3) \quad q_1(t) = q_1(o)e^{-\beta}$$

where $\beta$ depends on the metal temperature. This is an effective first order desorption, which is significantly faster than the normal desorption described by Eq. (2).

To achieve the foregoing and in accordance with the purposes of the present invention, a method of enhancing the desorption of a first isotope of a diatomic gas from a metal may comprise the steps of: establishing a partial pressure of a second isotope of said diatomic gas in the vicinity of said metal; heating said metal to a temperature such that said first isotope is desorbed from said metal; and reducing the partial pressure of said desorbed first isotope while maintaining the partial pressure of said second isotope substantially constant. The method is especially useful for enhancing the desorption of tritium from the bulk getter in a plasma confinement device, but may be used to enhance desorption of any diatomic gas from any metal.

Enhanced selective desorption offers several advantages over normal desorption. For a given desorbed fraction, the required desorption time is shorter: if it is desired to desorb 90% of a particular isotope, the enhanced desorption can be effected in one tenth the time required for conventional desorption at the same getter temperature. Desorption to the 99% level is more than 50 times faster. For a larger desorbed fraction, the relative time is even shorter. For a given time, the degree of desorption is greater for the enchanced case: in the same time required for conventional desorption to achieve 50% desorption, the enhanced process would result in 92% desorption. The same degree of desorption in the same time can be achieved for enhanced desorption at lower desorption temperatures.

DESCRIPTION OF THE DRAWINGS

The present invention is illustrated in the accompanying drawings wherein.

DETAILED DESCRIPTION OF THE INVENTION

The method of the present invention would be used during operation of a fusion reactor as follows. A getter module is used to remove impurities in a vacuum vessel which confines, say, a D-T plasma. During operation the getter becomes saturated with tritium, and then unable to continue pumping impurities. Since deuterium gas is already present in the vessel (and being used as fuel), the deuterium gas will be chosen as the second isotope for thermal desorption of the tritium from the getter. After heating the getter to cause desorption, the partial pressure of the tritium is reduced while the partial pressure of the deuterium is maintained substantially constant. This is accomplished by pumping gas containing both D and T from the vessel while injecting deuterium into the vessel using feedback controls to keep the partial pressure of deuterium constant. Once desorption of the tritium is complete and desorption of deuterium from the getter is desired, deuterium could either be desorbed in the normal manner (just by heating the getter) or hydrogen could be introduced to effect enhanced desorption.

Figure 1:
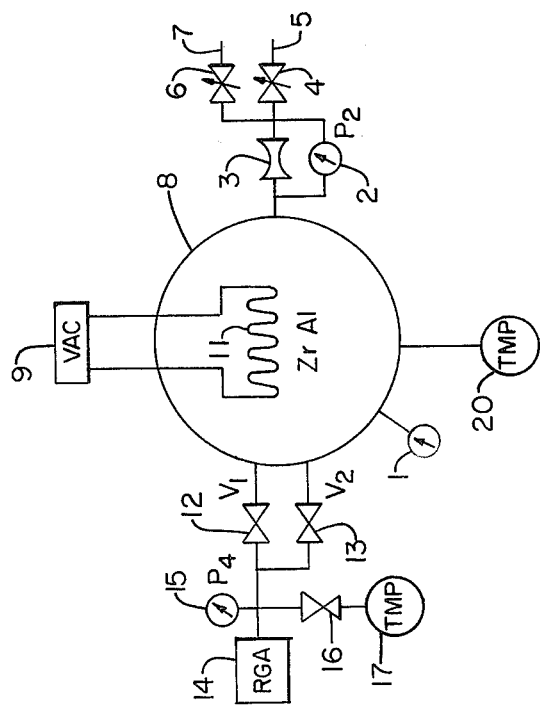
FIG. 1 is a schematic diagram of the thermal desorption apparatus used to desorb deuterium from a getter in the presence of hydrogen.

Referring to FIG. 1 vessel 8, which may be a test chamber or the vacuum vessel of a fusion reactor, is pumped by getter module 11 or turbomolecular pump 20.

Getter module 11 is powered by power source 9. Pressure gauge 1 measures the total pressure in vessel 8. The gas injection system comsists of pressure gauge 2, calibrated conductance 3, variable hydrogen gas leak 4, hydrogen gas source 5, variable deuterium gas leak 6, and deuterium gas source 7. Partial pressure measurements are made with the residual gas analyzer (RGA) system, which consists of large conductance valve 12, small conductance valve 13, RGA 14, pressure gauge 15, gate valve 16, and turbomolecular pump 17.

EXAMPLE

Experiments were performed using the test apparatus shown in FIG. 1. The bulk getter was a standard SAES Zr—Al alloy (ST 101 ®) nonevaporable bulk getter module (11) with a measured Zr—Al mass of 120±5 g. The module was contained in a 166 liter stainless steel vessel (8) pumped by a turbomolecular pump (20) having a measured $H_2$ speed of 340 l/s in the molecular flow regime. Hydrogen is introduced from source 5 and deuterium is introduced from source 7 into the chamber through separate valves (4 and 6 respectively) and a common calibrated conductance (3). A differential capacitance manometer (2) was used to measure the pressure drop across this conductance. From this measurement, both the flow rate and the total gas quantity was determined. The $H_2$ pressure was held constant by a feedback control of the $H_2$ piezo-electric valve (4). A quadrupole mass analyzer (14) was used to monitor the behavior of the $H_2$ and $D_2$ signals. The analyzer was located in a separately pumped chamber connected to the main chamber by a small conductance leak valve (13) facilitating measurements at high $H_2$ pressures in the main chamber. Prior to a run the ratio of the $D_2$ to $H_2$ was $2 \times 10^{-4}$.

The getter (11) was activated by heating to 700° C. for 45 minutes. Following activation, and with the getter (11) at 20° C., the base pressure in the main chamber was $6 \times 10^{-10}$ torr. $H_2$ was then introduced into the chamber and desorption commenced. Experiments were performed for getter temperatures in the range of 600° C. to 740° C., with the hydrogen concentration in the range from 0.2 to 2.5 torr $-$ l/g.

Figure 2:
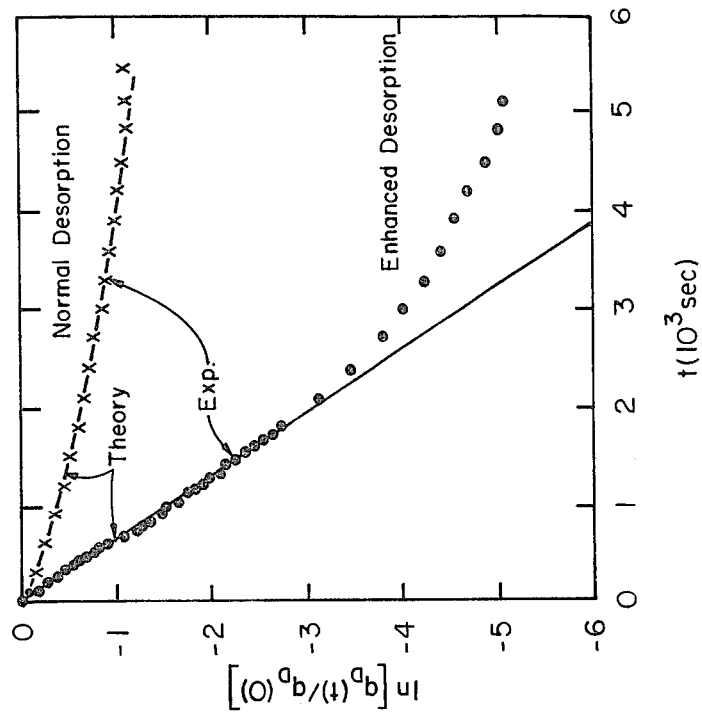
FIG. 2 is a graph of the measured and predicted time dependence of both enhanced desorption and normal desorption of deuterium from a Zr—Al getter.

FIG. 2 shows desorption of deuterium with time, with the getter at 670° C., initial deuterium concentration $q_D(o) = 0.23$ torr $-$ l/g, and a hydrogen pressure of $7 \times 10^{-4}$ torr (hydrogen concentration $q_H = 0.96$ torr $-$ l/g). The data exhibit an exponential decay which is in excellent agreement with the predicted behavior over four e-foldings. For comparison, normal desorption with time is also shown. In this case the getter was loaded to $q_D(o) = 0.24$ torr $-$ l/g and desorbed without hydrogen gas. After $5 \times 10^3$ seconds, the deuterium concentration had decreased by only 1.1 e-foldings showing the asymptotically slow desorption.

In this disclosure, there is shown and described only the preferred embodiments of the invention, but it is to be understood that the invention is capable of use in other combinations.

The embodiments of this invention in which an exclusive property or privilege is claimed are defined as follows:

1. A method of enhancing the desorption of a first isotope of a diatomic gas from a metal comprises the steps of:
    (a) establishing a partial pressure of a second isotope of said diatomic gas in the vicinity of said metal;
    (b) heating said metal to a temperature such that said first isotope is desorbed from the metal; and
    (c) reducing the partial pressure of said first isotope while maintaining the partial pressure of said second isotope substantially constant.

2. The method of claim 1 wherein said diatomic gas is hydrogen and said first isotope is tritium.

3. The method of claim 1 wherein said diatomic gas is hydrogen and said first isotope is deuterium.

4. A method of claim 1 wherein said diatomic gas is hydrogen and said first isotope is hydrogen.

5. A method of enhancing the desorption of a first isotope of hydrogen from a metal contained in a plasma confinement device comprises the steps of:
    (a) establishing a partial pressure of a second isotope of hydrogen in said plasma confinement device;
    (b) heating said metal to a temperature such that said first isotope is desorbed from the metal; and
    (c) reducing the partial pressure of said first isotope while maintaining the partial pressure of said second isotope substantially constant.

6. The method of claim 4 wherein said metal comprises a Zr—Al bulk getter.

7. The method of claim 5 wherein said first isotope is deuterium.

8. The method of claim 5 wherein said first isotope is tritium.

9. The method of claim 6 wherein said getter is heated to from 600°–740° C.

10. The method of claim 8 wherein said second isotope is hydrogen and said hydrogen partial pressure is approximately $7 \times 10^{-4}$ torr.

* * * * *